(12) United States Patent
Hickman et al.

(10) Patent No.: US 8,644,503 B2
(45) Date of Patent: Feb. 4, 2014

(54) CONTENT SERVER SYSTEMS AND METHODS

(75) Inventors: Paul L. Hickman, Los Altos Hills, CA (US); Michael L. Gough, Saratoga, CA (US)

(73) Assignee: G&H Nevada-Tek, Los Altos Hills, CA (US)

( * ) Notice: Subject to any disclaimer, the term of this patent is extended or adjusted under 35 U.S.C. 154(b) by 251 days.

(21) Appl. No.: 12/404,303

(22) Filed: Mar. 14, 2009

(65) Prior Publication Data

US 2009/0290850 A1 Nov. 26, 2009

Related U.S. Application Data

(63) Continuation of application No. PCT/US2007/020008, filed on Sep. 14, 2007.

(60) Provisional application No. 60/844,747, filed on Sep. 14, 2006.

(51) Int. Cl.
- *H04N 7/167* (2011.01)
- *H04L 9/32* (2006.01)
- *G05B 19/00* (2006.01)

(52) U.S. Cl.
USPC .......................... 380/201; 713/176; 340/582

(58) Field of Classification Search
USPC .................. 380/201; 713/176; 340/5.82
See application file for complete search history.

(56) References Cited

U.S. PATENT DOCUMENTS

| | | | |
|---|---|---|---|
| 7,720,767 B2* | 5/2010 | Ta et al. | 705/59 |
| 2001/0051996 A1* | 12/2001 | Cooper et al. | 709/217 |
| 2002/0147047 A1* | 10/2002 | Letovsky et al. | 463/42 |
| 2003/0009542 A1* | 1/2003 | Kasal et al. | 709/222 |
| 2004/0039914 A1* | 2/2004 | Barr et al. | 713/176 |
| 2004/0225894 A1* | 11/2004 | Colvin | 713/200 |
| 2004/0258274 A1* | 12/2004 | Brundage et al. | 382/100 |
| 2004/0260669 A1* | 12/2004 | Fernandez | 707/1 |
| 2005/0055312 A1* | 3/2005 | Wilson et al. | 705/51 |
| 2005/0249374 A1* | 11/2005 | Levy | 382/100 |
| 2006/0053080 A1* | 3/2006 | Edmonson et al. | 705/59 |
| 2006/0100924 A1* | 5/2006 | Tevanian, Jr. | 705/14 |
| 2006/0251289 A1* | 11/2006 | Williams | 382/100 |
| 2006/0253894 A1* | 11/2006 | Bookman et al. | 726/2 |
| 2007/0022469 A1* | 1/2007 | Cooper et al. | 726/3 |
| 2007/0061487 A1* | 3/2007 | Moore et al. | 709/246 |
| 2007/0174471 A1* | 7/2007 | Van Rossum | 709/229 |
| 2007/0203845 A1* | 8/2007 | Gross et al. | 705/59 |
| 2009/0044253 A1* | 2/2009 | Interlandi et al. | 726/4 |
| 2009/0254960 A1* | 10/2009 | Yarom et al. | 725/115 |

FOREIGN PATENT DOCUMENTS

WO   WO2008033507   3/2008

\* cited by examiner

*Primary Examiner* — Techane Gergiso
(74) *Attorney, Agent, or Firm* — TIPS Group

(57) ABSTRACT

A content server system includes a remote content server including content license information and a local content player coupled to the remote content server by a network, the local content player requiring verification of a license by a user of the local content player as administered by the remote content server. In an alternate embodiment the network includes a local area network. In another alternate embodiment, the network includes the Internet.

9 Claims, 8 Drawing Sheets

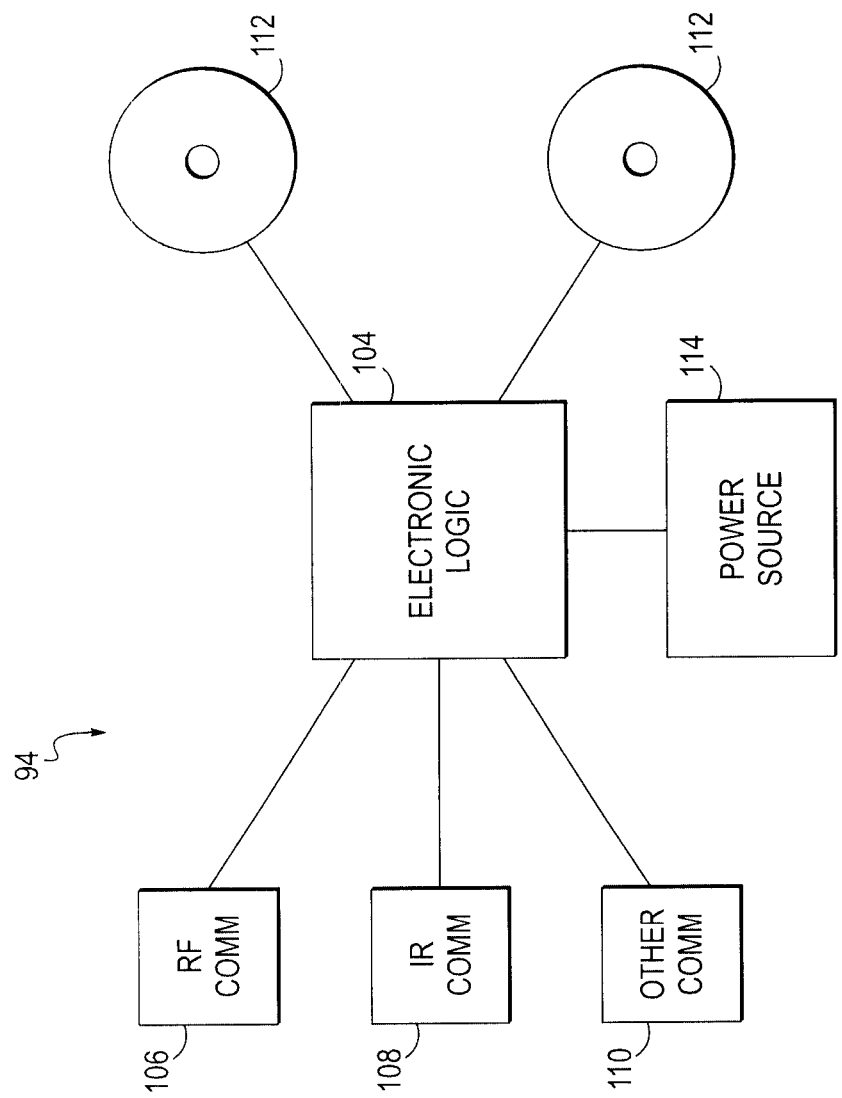

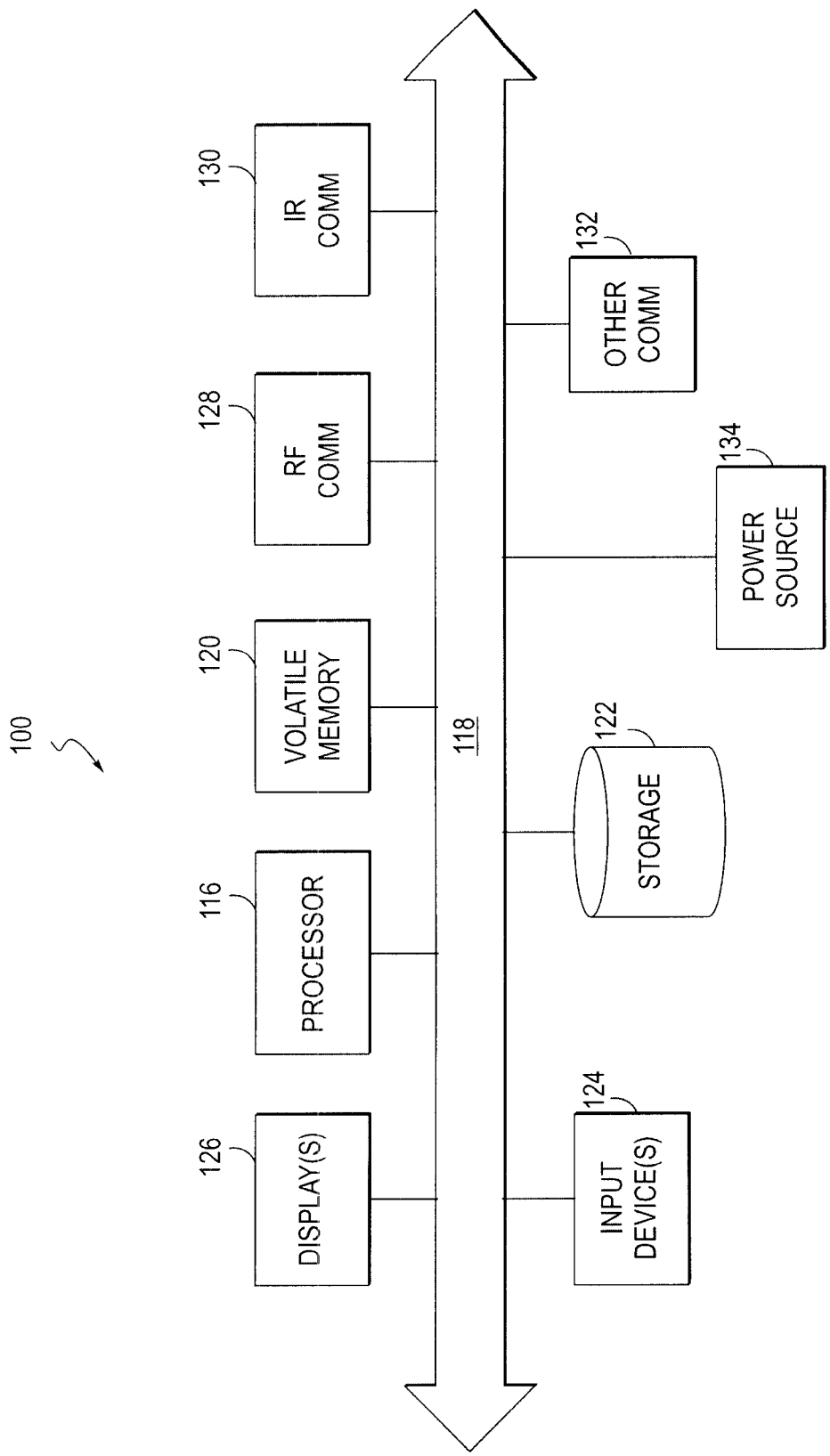

CONTENT SERVER SYSTEMS AND METHODS

CROSS REFERENCE TO RELATED APPLICATIONS

This application is a continuation of International Patent Application No. PCT/US07/020008, filed on Sep. 14, 2007, which claims the benefit of U.S. Provisional Patent Application No. 60/844,747, filed on Sep. 14, 2006, both of which are incorporated herein by reference.

BACKGROUND

DVDs are a popular form of storage for relatively large quantities of data. One of the more popular uses for the DVD format is the recording of movies for the consumer market. While DVDs have a great number of advantages, they suffer from damage such as scratches on their surfaces. Since DVDs are optical storage, these scratches can make the movies stored on the DVDs partially or wholly unwatchable. Likewise, if other forms of data are stored on the DVDs, the data can be wholly or partially corrupted.

Many people have large collections of DVDs. These DVDs tend to become disorganized, damaged, and lost over time. Furthermore, the DVDs, while relatively compact in size, are bulky in larger numbers and, as such, are cumbersome to store or transport.

DVDs are only one popular form of removable mass storage. Other forms include, but are not limited to, CD-ROMS, CDs, the new high-definition formats for digital video, removable magnetic storage, removable semiconductor storage, etc. As used herein, the term "removable storage" will refer, by example, to these and other equivalent forms of storage.

The protection of digital content is also an area of growing concern. Content owners are concerned with the proper use of their copyrighted materials. The ability to track and/or enforce proper usage of copyrighted materials is therefore important.

Also, the ability to deliver content efficiently is becoming ever more important, particularly in view of the increasing mobility of the population. This not only includes the delivery of content without the requirement for physical media (e.g. by transmission over the Internet) but also efficient "players" for reproducing the content by the user.

SUMMARY

Many exemplary embodiments are disclosed herein to address the above-mentioned and other problems. The following embodiments are presented by way of example and not limitation.

In an embodiment, set forth by way of example and not limitation, a content server system includes a remote content server including content license information; and a local content player coupled to the remote content server by a network, the local content player requiring verification of a license by a user of the local content player as administered by the remote content server. In an alternate embodiment the network includes a local area network. In another alternate embodiment, the network includes the Internet.

In an embodiment, set forth by way of example and not limitation, a content player includes a player configured to read a digital memory which at least temporarily contains content, the digital player being provided with a dongle means providing digital rights management, the digital player being operative to develop at least one of audio and visual output should the digital rights management permit a playback of the content, the digital player having an output device for rendering the at least one of audio and visual output in a user-perceptible form.

In an embodiment, set forth by way of example and not limitation, a dongle includes a processor; memory storing digital content including at least one of audio and video content for which a user has a license; and an interface for transferring the digital content from the dongle in accordance with the license.

In an embodiment, set forth by way of example and not limitation, a video content server includes: a processor; a storage coupled to the processor having digital rights management data including license information with respect to a requester of video content; and a process running on the processor for associating a watermark with the video content in accordance with the license prior to the delivery of the video content to the requester. In an embodiment the network includes a local area network. In an alternate embodiment, the network includes the Internet.

In an embodiment, set forth, by way of example and not limitation, a method for providing a content server includes: receiving over a network content derived from an optical storage medium; associating the content with a license; and permitting access to the content over the network in accordance with the license.

In an embodiment, set forth by way of example and not limitation, method for providing a content server includes: receiving over the Internet at a license server a request for content from a requester; determining whether the request is in accordance with a license associated with the requester; and delivering the content to the requestor if the request is in accordance with the license.

In an embodiment, set forth by way of example and not limitation, a method for playing content from an optical media includes: playing content from an optical media; detecting if there is a problem with playing the content; and contacting a server for supplemental content to remedy the problem should a problem be detected. In an embodiment, the server is contacted over the Internet.

In an embodiment, set forth by way of example and not limitation, wireless content earphones includes a processor means; a wireless transceiver means coupled to said processor means and operative to communicate bi-directionally with a content source; and at least one earphone coupled to the processor means.

In an embodiment, set forth by way of example and not limitation, a wireless content player includes a processor; digital memory coupled to the processor; a receiver coupled to the processor and capable of at least temporarily storing received content in the digital memory; an output driver coupled to the processor to provide video signals; and at least one video display coupled to the output driver.

These and other embodiments will be apparent to those of skill in the art upon a study of the specification and drawings.

BRIEF DESCRIPTION OF THE DRAWINGS

FIG. 8A is a block diagram of exemplary circuitry for the wireless earphone embodiment of FIG. 8;

FIG. 9A is a block diagram of exemplary circuitry for the wireless DVD player embodiment of FIG. 9.

DETAILED DESCRIPTION OF EXEMPLARY EMBODIMENTS

Figure 1:
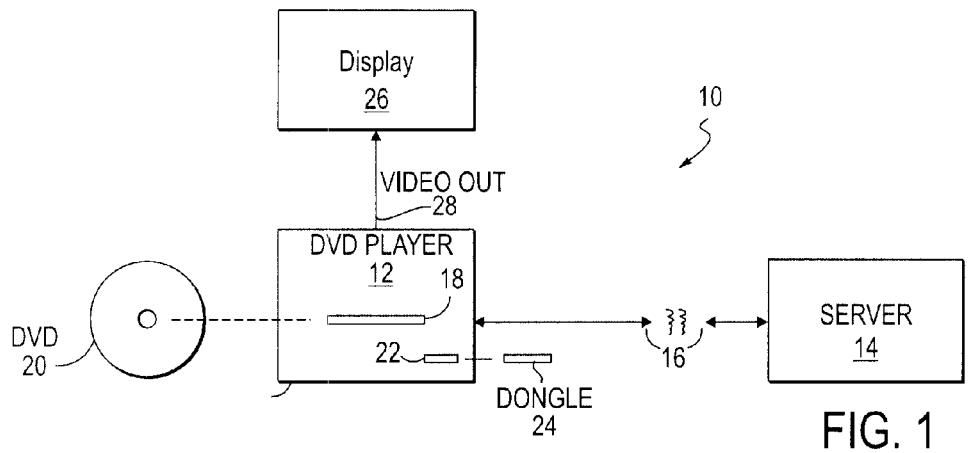
FIG. 1 is a block diagram of an exemplary embodiment comprising a DVD player and server system.

FIG. 1 is a block diagram of one embodiment of a DVD player and server system, provided by way of example, not limitation. In FIG. 1, a system 10 includes a player 12 and a server 14. The player 12 and the server 14 are coupled together by a communications link 16. In this embodiment the player 12 includes an opening 18 for a DVD 20 and an opening 22 for a dongle 24. A display 26 can display, for example, the video output 28 of the player 12.

The player 12 can be a dedicated DVD player with additional functionality to accommodate the apparatus and methods disclosed herein. Alternatively, the player can simply be a computer system, e.g. a laptop computer system. Still further, the player can be a conventional DVD player, with additional apparatus attached, as will be appreciated by those skilled in the art. It will be appreciated that the foregoing are non-limiting examples and not an exhaustive listing of all permutations, alterations, and equivalents.

The server 14 typically comprises a computer system. A server typically digitally communicates with a number of other systems, although sometimes it can be associated with a single other system, such as a DVD player, television, computer, etc. As such, the server 14 typically includes a microprocessor, RAM memory, mass storage such as semiconductor, magnetic, and/or optical mass storage, and various communication ports (e.g. parallel, serial, network, etc.) In an exemplary embodiment of one aspect of the invention a redundancy system would be introduced to protect the data from corruption due to media failure. Redundancy systems are well known and include RAID arrays and error correction coding schemes such as those disclosed in *The Art of Error Correcting Coding* by Robert H. Morelos-Zaragoza. ISBN: 0-471-49581-6, which is incorporated herein by reference.

In a further exemplary embodiment, the storage system can replicate its data periodically with one or more other storage systems over a communications link, using a synchronization protocol, such as "rsync." Such data replication/synchronization makes it possible to recover from the failure, theft or destruction of the server 14 without data loss.

The communications link 16 can be, by way of non-limiting examples in various alternate embodiments, a serial bus, a parallel bus, a wireless connection (IR, RF, etc.), a local area network (LAN), a wide area network (WAN) such as the Internet, etc. While it is generally desirable to make the communications link bi-direction and as fast as possible, other configurations are also possible in alternate embodiments.

In the exemplary embodiment of FIG. 1, there is an opening 18 for a DVD disc 20. In this exemplary embodiment, a DVD drive mechanism is located within the DVD player to play and otherwise interact with the DVD disk 20. In other embodiments, other configurations are employed. In further embodiments, other removable storage media than DVD discs are employed. In still further embodiments, no removable storage media are employed.

In this exemplary embodiment, an opening 22 is provided for dongle 24. In other embodiments, the opening 22 is omitted (e.g. for a wireless dongle, or for a dongle that attaches to a port). In still other embodiments alternatives, such as a keypad or biometric sensor are provided. In still other embodiments, the dongle and its equivalents structures are omitted entirely.

As will be appreciated by those skilled in the art, a "dongle" is a piece of hardware used for security purposes. Typically, a dongle will include an encryption code or algorithm, and may include computational power. Currently, dongles are often connected into a USB port, but other connection mechanisms are also common. Dongles can also include a substantial amount of memory, e.g. flash memory. Power may or may not be provided internally to the dongle, depending upon the type of dongle. For example, USB dongles can be powered by the USB bus and, therefore, power is not a requirement in certain embodiments.

An important aspect of a dongle to identify an authorized user. This identification function can be handled in alternative fashions to dongles, e.g. biometric sensors (such as a fingerprint reader), password codes, etc. As used herein, the term "dongle" in certain embodiments can include apparatus and methods which accomplish the desired result of authorized user verification.

In an exemplary embodiment, the dongle includes a key for encryption/decryption. Both asymmetric and symmetric encryption schemes may be used. In the case of asymmetric encryption, the key contained on the dongle would contain at least one of the private key or the public key. The public key is used to encrypt, and the private key is used to decrypt.

An exemplary embodiment associates the private key, the public key, and the encrypted data so that the required keys can be retrieved using a lookup mechanism when they are needed. If the required key is not available, then an error message is provided so that the user knows that he does not have the proper key. Since the keys are often embodied in the form of cryptic binary data, an exemplary embodiment provides the functionality for naming the keys. A further exemplary embodiment provides the name of the required key when displaying the aforementioned error message. An exemplary embodiment provides for a key registry which associates cryptographic keys with the identity of authorized users.

A further exemplary embodiment provides for "watermarking" of content information which could be used for example to protect the rights of copyright holders, as well as other uses. Such watermarks contain information that identifies the user or the machine used to encode or store the content information. The watermarks endure repeated decoding and re-encoding in a cumulative manner, so that an audit trail is generated that details the history of the content information.

In a further exemplary embodiment, the watermarks are associated with information identifying one or more authorized users. Additional information stored in watermarks, such as information identifying the time and place of encoding, is also optionally provided. In an exemplary embodiment, a tamper resistant apparatus provides time (derived for example from an internal clock), location (derived for example from GPS), and user identification information (derived for example from an internal serial number, or biometrics) for watermark information or other purposes. In a further exemplary embodiment, watermarking is used for data of arbitrary kinds, such as scanned documents, word processing documents, spreadsheets, music, photographs, telemetry, streaming video, source code, and numerous other data types.

In certain exemplary embodiments, watermarking for some kinds of content is based on watermark information that is added externally to the content data, because the content information is sensitive to the minor changes of watermarking. In cases such as this, a "digital envelope" can be used to contain the information and the associated watermark information. One envelope can contain other envelopes in a hierarchical manner, thus providing for the aforementioned audit trail. Both encrypted and non-encrypted digital envelopes are used in alternate embodiments. When encrypting envelopes, both symmetric and asymmetric encryption schemes are used in alternate embodiments.

In a still further exemplary embodiment, the data is not stored, but is simply "passed through" the apparatus in a streaming manner, with the watermark information being added in a cumulative manner to any that had been previously added.

Many types of dongles exist. A common type of dongle includes a USB connector to plug into a USB port. Therefore, the opening 18 of the DVD player 12 can be an USB port. Other types of ports and connectors can also be used. Alternatively, the opening 18 can be replaced with other interconnect mechanisms, such an optical (e.g. IR port), an RF port, a sonic port, etc. The dongle will typically at least include non-volatile memory capable of storing data or algorithms which identify the possessor of the dongle as an authorized user. In this way, the dongle acts as a "key" to unlock certain permitted functionalities of the system. This "key" is preferably transportable and can be loaned to others.

A dongle can also serve as a storage system. If sufficient memory is provided (e.g. by a large flash memory, a miniature disc drive, etc.) all or part of, for example, a movie or a music album can be stored in the dongle. In this way the content is transportable with the dongle. In an exemplary embodiment, storing of the content in the dongle prevents downloads from the server to prevent multiple copies from being played. In another exemplary embodiment, the storing of content in the dongle also causes the player to block any playing of that content.

The display 26 can be any number of types of displays, such as television CRTs, plasma displays, led displays, computer monitors, etc. The type of display 26 will determine the type of video out 26 from the player 12. Just several of many examples of video out include NTSC, High Definition, RGB, S-Video, high speed video busses, etc. Furthermore, if the player 12 is an integrated unit such as a laptop computer, the video out 28 may simply be the system video output bus.

Figure 2:
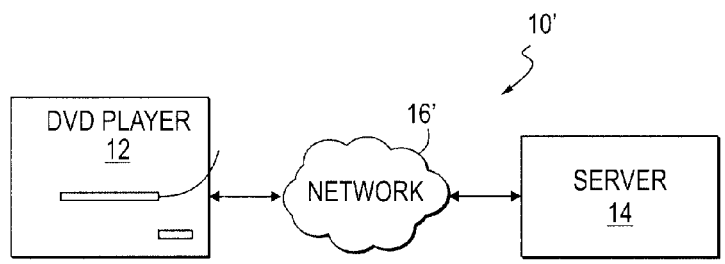
FIG. 2 is a block diagram of an exemplary embodiment including a network connection.

FIG. 2 illustrates an exemplary and non-limiting system 10' including a network 16' which corresponds to one embodiment of the communication linkage 16 of FIG. 1. The network 16' can be a local area network (LAN), such as an NT® network from Microsoft Corporation, a Novell® network from Novell Corporation, an Intranet using TCP/IP data packet protocols, any other form of LAN, etc. Alternatively, the network 16' can be a wide area network (WAN) such as the Internet using TCP/IP data packet protocols, etc.

Figure 3:
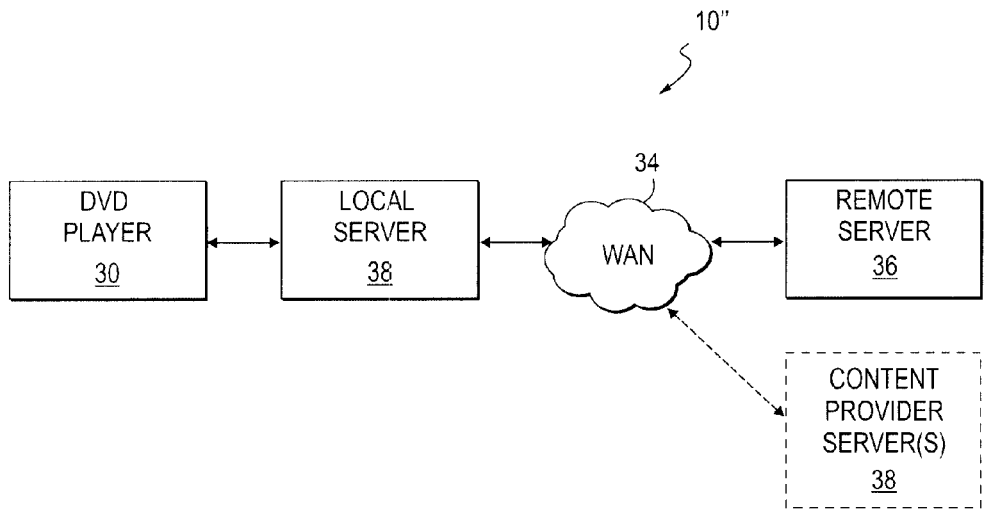
FIG. 3 is a block diagram of an exemplary embodiment with multiple servers.

FIG. 3 illustrates an exemplary system 10" including a player 30, a local server 32, a WAN 34, a remote server 36, and optional content provider server(s) 38. With this additional non-limiting example, a local server 32 provides high-bandwidth access to content stored on the server. This server may be, for example, located in a user's home and coupled to, or forms a part of, the DVD player 30. The local server 32 is then coupled to the remote server 36 via WAN 34. This permits off-site archiving of the media or metadata of the user's DVDs. It further facilitates accessing of the DVD information via the WAN 34, e.g. for example when the user is taking a trip. Of course, the local server 32 can also be accessed, but in certain embodiments it is considered desirable to use the local server 32 more as a local "cache" or as a supplement than as the primary server. In other embodiments, the local server is the primary or even sole server.

The optional content provider server(s) can be under the control of the content owners, either directly or by license. Therefore, a user can buy the rights to a particular DVD (or music CD, or other digital data or recordings) directly or indirectly from the content providers, and can access that information via WAN 34 (e.g. the Internet). If a license is purchased and associated with a particular dongle, the user may not even need to have a physical DVD (or CD, etc.) disk, but can download content (e.g. as a file, in a streaming format, etc.) directly from the remote server 36, content provider servers 38, etc.

An aspect of embodiments of the invention is the possibility of eliminating the need for users to purchase physical copies of media content, such as DVDs, CDs, etc. In such embodiments, licenses are purchased, directly or indirectly, from content providers and associated with the purchaser. This association can be by a dongle, another form of "key" (such as passwords, biometrics, etc.), and other methodologies for authorized user identification. The content can then be accessed electronically, e.g. from a home or web based server, subject to the restriction (if any) of the licensor.

Figure 4:
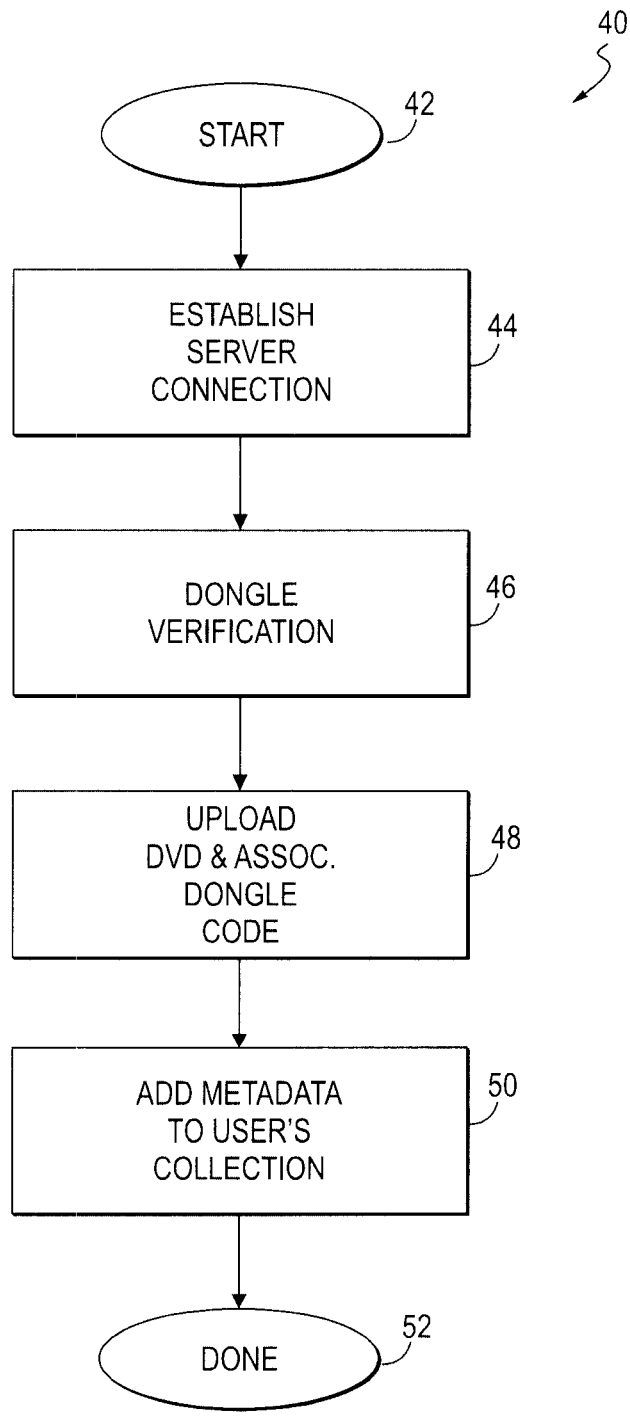
FIG. 4 is a flow diagram illustrating an exemplary archive mode process embodiment.

In FIG. 4, an embodiment for an "archive mode" process 40 is presented by way of non-limiting example. The process 40 may begin at 42 and, in an act 44, a server connection is established. This is often over the Internet, but it may also be to a local server, or otherwise. In an act 46, the server verifies the dongle. By "verify" it is meant that secure information is derived from the dongle to identify an authorized user. Next, in an act 48, the content of the DVD may be uploaded to the server, which associates this content with the dongle code. In this fashion, downloads will be restricted to authorized (e.g. licensed) users, and unauthorized distribution or access will be detectable. Next, in an optional act 50, metadata such as the title, actors, and other information can be added to the user's collection. In this way, a menu of movies, songs, music, data, etc. can be presented to the user. By way of non-limiting example, this menu or catalog or collection can be downloaded to the player 12 and displayed and manipulated on the display 26. The process 40 may then be completed at 52.

Figure 5:
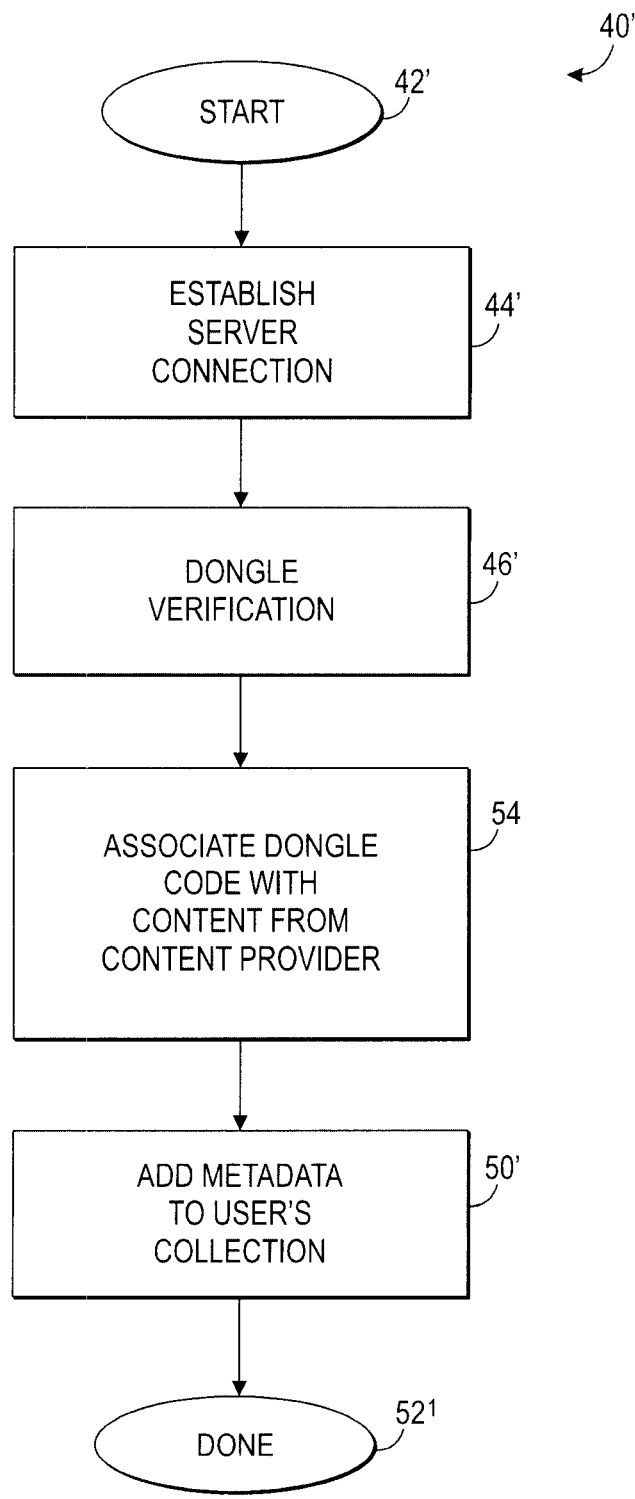
FIG. 5 is a flow diagram illustrating an alternative exemplary archive mode process embodiment.

In FIG. 5, another non-limiting example for an "archive mode" process 40' begins at 42', and a server connection is made at 44'. As before, a dongle verification may occur at 46'. Next, in an act 54, the dongle "code" (e.g. identifying information, often but not always encrypted) is associated with the content from a content provider. For example, a user may buy a license directly or indirectly from the content provider, and then associate that license with the dongle code on the server. From then on, the dongle can be used to access that content via the WAN, in this non-limiting example. The metadata may be optionally added in act 50', and the process 40' may be completed at 52'.

Figure 6:
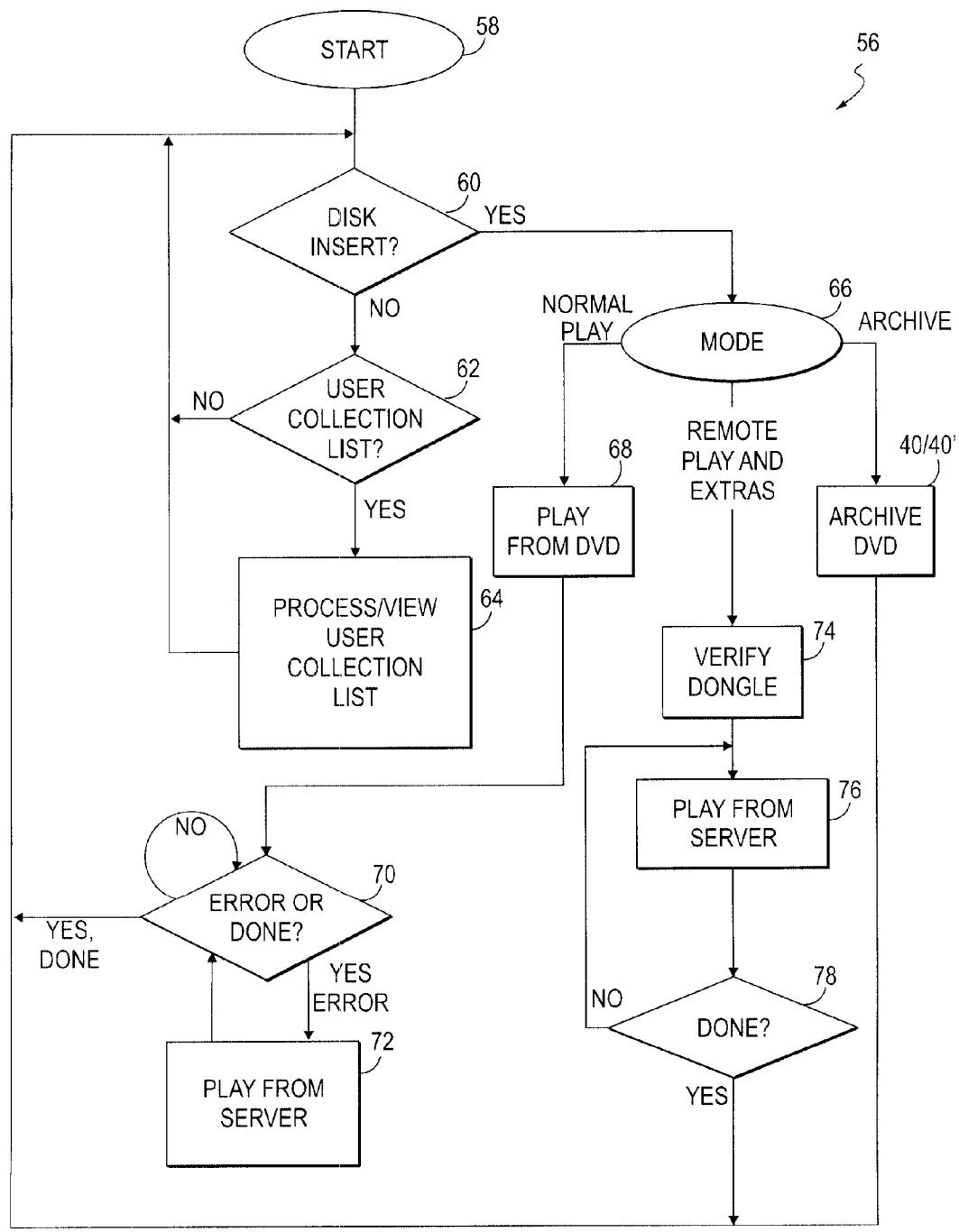
FIG. 6 is a flow diagram illustrating an exemplary user mode process embodiment.

FIG. 6 illustrates by way of non-limiting example a "user mode" process 56 when the user has access to a player. The process 56 begins at 58 and, in an act 60, it is determined if a disc is inserted into the player. (Of course, other modes not triggered by the insertion of a disc are alternative embodiments.) If not, an act 62 determines if the user wishes to view his user collection list. If not, process control is returned to act 60, or the process may be terminated. If the user does want to access his user collection list, in an act 64 the user processes or views the user collection list. The user collection list can be, of course, stored anywhere on the system including the player, a local server, a remote server, etc. Process control is then returned to act 60, or terminated.

In an act 66, the mode of the player is determined. If it is in a "Normal Play" mode, a DVD can be played in its normal fashion in an operation 68. However, if the user has previously archived the DVD, error correction is also possible. That is, if there is an error in the DVD play due, for example, to a scratch on the DVD disk, this can be detected by act 70. At the point of the scratch, the player can play the damaged portion from the server, thereby providing a patch for the bad portion of the DVD disk. Alternatively or additionally, additional content can be added to the play of the DVD disc at this point. For example, extra or alternative scenes can be provided, high definition data can be added, etc. as part of the "play from server" act 72. If act 70 determines that the play of the DVD is complete, process control may be returned to act 60 or, for example, terminated.

If mode 66 detects a "remote play" request, where the user is not physically present near his "home" player, it looks for the dongle that the user preferably takes with him. The dongle can provide a code for one or more content files, records, etc. (e.g. DVD archival copies). If the server verifies the dongle is valid in act 74, it begins to play from the server in an act 76. This play can be accomplished in various fashions, including downloading the file, streaming the video and/or audio file, etc. The remote play can be facilitated with an application program or utility on the remote system (e.g. computer), or the play can be facilitated through web-based protocols, such as a web browser and media player. When the playing is completed as detected by act 78, process control can be returned to operation 60, terminated, etc. Also, if act 66 detects that the user wished to archive a DVD, a process including, but not limited to, processes 40 and 40' can be implemented.

Figure 7:
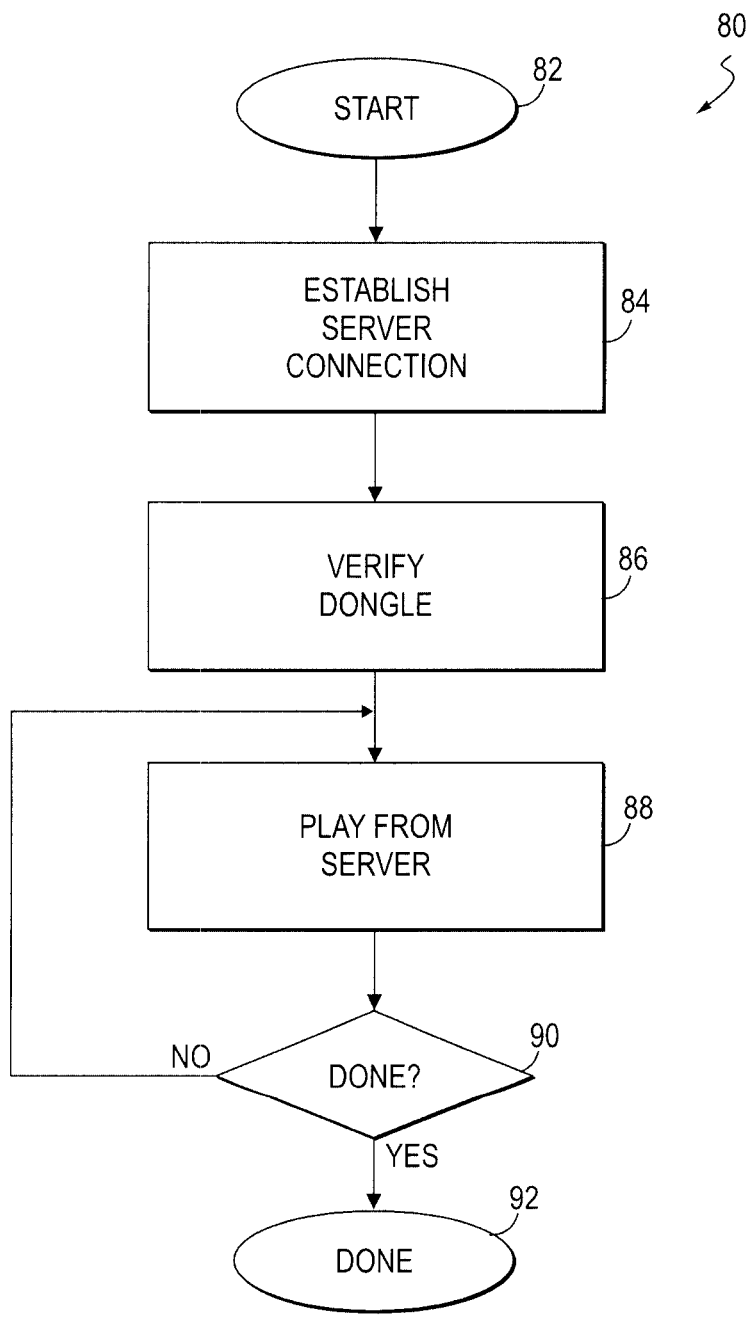
FIG. 7 is a is a flow diagram illustrating an alternative exemplary user mode process embodiment.

By way of a still further non-limiting example, in FIG. 7 a second example for a "user mode" process 80 is illustrated. In this example, the user is remote from his home system. The process 80 begins at 82 and, in an act 84, a connection is established to a server. An act 86 verifies the dongle, and an act 88 plays from the server as described previously. An act 90 determines if the play is done and, if so, the process 80 terminates at 92.

By way of a more concrete example, provided solely for illustration and not limitation, assume that the user is traveling and has his portable computer and his dongle. He can then connect to a narrow or broadband Internet connection, by way of non-limiting example, and access the server. The user may have specialized software on his system for this purpose, or may access the server through, by way of non-limiting example, a web browser. The server can then download (e.g. as a file) or stream a desired movie file to the user. There are many formats and ways for downloading or streaming data files, including MPEG, JAR files, etc. that are well known to those skilled in the art. Since the user has the dongle, downloading is no longer available at the home player in this exemplary embodiment, unless multiple dongles are provided.

Figure 8:
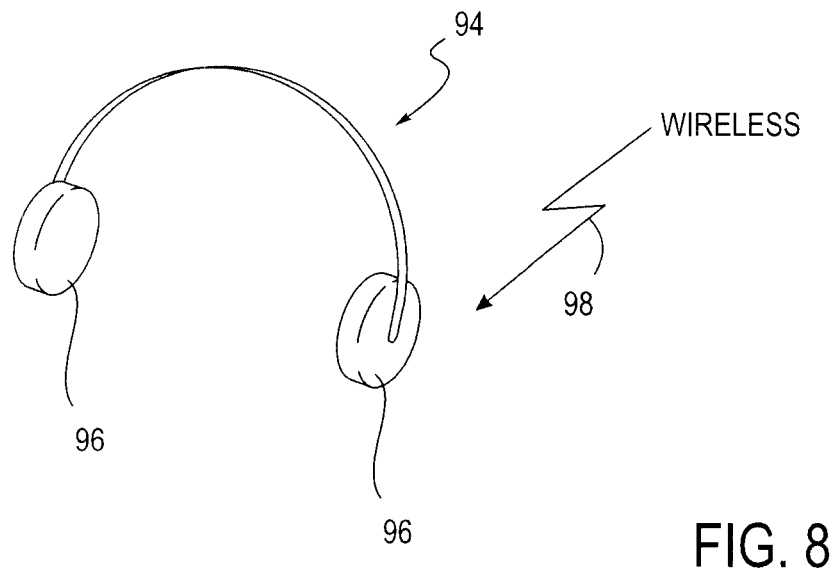
FIG. 8 illustrates an exemplary wireless headset or earphone embodiment.

In FIG. 8, a wireless headset 94, provided by way of a non-limiting example, can access the server via a wireless protocol. For example, the popular WiFi protocol can be used, as well as shorter range protocols such as BlueTooth and longer range protocols. Controls and wireless circuitry and mechanisms can be provided on the ear cups 96 or elsewhere. For example, the headset 94 can communicate with an iPod® of Apple Computer or other device by, for example, BlueTooth, to provide controls. As another non-limiting example, the headset 94 can be voice command controlled with the addition of a microphone. In this way, music, such as music CDs or MP3 files can be downloaded, streamed, etc. to the headset 94 via a wireless connection 98. A dongle may or may not be used with this system.

FIG. 8A is a block diagram of a non-limiting exemplary embodiment of the wireless headset 94 of FIG. 8. In this example, headset 94 includes electronic logic 104; at least one of RF communications apparatus 106 coupled to electronic logic 104, IR communications apparatus 108 coupled to electronic logic 104, and other communications apparatus 110 coupled to electronic logic 104; one or more electro-acoustic transducers 112 coupled to electronic logic 104; and power source 114 coupled to electronic logic 104 which supplies power to the various components via the electronic logic 104.

It is contemplated that analog or digital signals may be received and processed in various exemplary embodiments. In the case of digital signals, the data may be received in binary form, and may further be quantized into packets which are received by one or more of the various communications apparatus and decoded, and converted into a form suitable to be propagated to the electro-acoustic transducers 112. It should be noted that the communications mentioned herein may require encryption and decryption in certain embodiments. Other embodiments receive and process an analog signal into a form suitable for propagation to the electro-acoustic transducers.

In certain embodiments, a feature is provided which allows two-way communication between the wireless headset and the device or devices with which it communicates, which may include content players, personal computers, security devices such as dongles, etc. The signals that pass to and from wireless headset 94 via the various communication subsystems may include participation in various communications protocols which require two-way communication. Query, authentication, control signals, query responses may be present in certain embodiments as well. The headset may comprise input devices such as buttons or a microphone etc. which are coupled to electronic logic 104 which may be used to allow user interaction. Additional devices which may be interfaced to wireless headset 94 include dongles which may be used to answer authentication challenges, provide crypto keys, interpret watermarks, etc.

Figure 9:
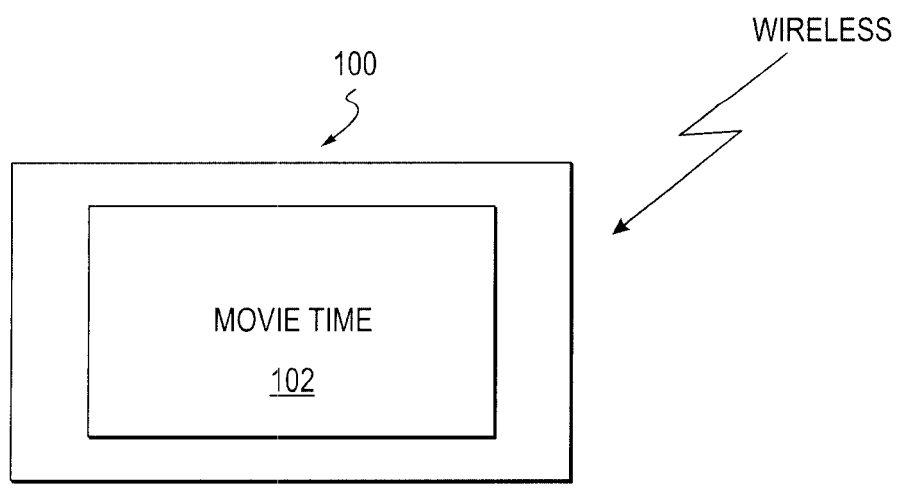
FIG. 9 illustrates an exemplary wireless DVD player embodiment.

In FIG. 9 a wireless content player 100 has a screen 102. The player 100 communicates with a wireless protocol as set forth above. Again, the player could be a full fledged portable computer but, in this non-limiting example, it is a more limited computational device designed primarily for the viewing of movies and other audiovisual content. Again, a dongle may or may not be used with this system, or any of the previous exemplary systems disclosed or implied herein.

FIG. 9a is a block diagram of a non-limiting exemplary embodiment of a wireless content player 100 including a processor 116 which is coupled to bus 118; volatile memory 120 which is coupled to bus 118; non-volatile storage 122 which is coupled to bus 118; optional input device(s) 124 which may be coupled to bus 118; optional display(s) 126 which may be coupled to bus 118; at least one of RF communications apparatus 128, IR communications apparatus 130, and other communications apparatus 132 which may be present in various combinations and coupled to bus 118; and power source 134 coupled to bus 118 which provides power to the various components and subsystems via bus 118. Query and control signals may be received via input device(s) 124 or via the various communications subsystems 128, 130 and 132. Metadata regarding content and query responses may be displayed on display(s) 126 or forwarded via communications subsystems 128, 130 and 132 to external devices such as wireless headset 94 or other devices such as dongles, etc.

In an alternative embodiment, the "players", e.g. the DVD, CD, computer, etc. players of content, help to enforce the terms of the content licensors. By way of non-limiting example, the DVD player 12 can communicate with a server 14 (and additionally or alternatively with other players) to ensure that only one version of a DVD movie is being played at one time. For example, the server may detect that a DVD movie is being streamed to a computer for viewing and, therefore, not allow streaming elsewhere or for the user to play his own DVD until the remote streaming is completed by communicating with the player. This kind of functionality would provide comfort to content licensors in that only one version of licensed content could be used at a time, not two (i.e. the original DVD and its archived version).

With this alternative embodiment, authorized sharing of content is facilitated. No dongle would be required by the person to whom the content is loaned, although they can be provided for additional security. By way of non-limiting example, a loaner (i.e. the person with the license) could provide a loanee (e.g. a friend) with an access code for a particular movie, song, etc. or group of movies, songs, etc. ("loaned content"). The loanee would then access the loaned content from the, and the loaner would be denied access to that content by the server. That is, the loaner would not have access to that content from the server and, in certain embodiments, would also be blocked from playing the loaned content from players forming a part of the system, until he removed the "loan" from the server system. This system has distinct advantages over, for example, physically loaning a DVD to a friend, which may become lost, damaged, or which may never be returned.

Note that in certain embodiments, various devices such as wireless headset 94 or wireless content player 100 may interface directly with a security device such as a dongle, and the dongle may provide responses to security challenges. Further, the dongle may be operative to authenticate content based upon a signal developed by a watermark present in the content. The watermarks as disclosed herein are comprised of minor alterations in the original content signals which may be used to personalize a content signal to a specific user, or device such that said content cannot be used by others. Watermarks may be embedded in a video stream, an audio stream, or in a system portion of a content signal.

While various exemplary embodiments have been described, those skilled in the art will realized that there are may alterations, modifications, permutations, additions, combinations, and equivalents as which fall within the broad concept's true spirit and scope. By way of non limiting examples, dongles and other user authorizing systems may be omitted in certain alternative embodiments. In some alternative embodiments encryption may be used, and in other it may be omitted. While optical storage devices have been the subject of most of the exemplary embodiments, other storage media is used in certain alternative embodiments. Servers may be omitted in certain embodiments, or their functionality, in part or in whole, may be distributed or combined with other apparatus, such as the player. It is therefore intended that the preceding descriptions not be read by way of limitation but, rather, as examples with the broader scope of the concepts disclosed herein.

What is claimed is:

1. A video content server system comprising:
   at least one electronic processor;
   a network port receptive to streaming video content associated with an identification of at least one authorized user of said video content;
   storage coupled to said processor for storing said streamed video content;
   storage coupled to said processor having digital rights management data including license information with respect to said at least one authorized user of said video content;
   a redundancy storage system to redundantly store data related to said video content; and
   a process running on said processor for associating a non-visible watermark with said video content in accordance with said license prior to streaming said video content to said
   authorized user via said network port, wherein said non-visible watermark includes biometrics;
   wherein said non-visible watermark identifies at least one authorized user and at least one authorized machine.

2. A video content server system as recited in claim 1 wherein said watermark endures decoding.

3. A video content server system as recited in claim 1 wherein said watermark endures encoding.

4. A video content server system as recited in claim 1 wherein said watermark includes an audit trail.

5. A video content server system as recited in claim 1 wherein said watermark includes a time of encoding.

6. A video content server system as recited in claim 1 wherein said watermark includes a place of encoding.

7. A video content server system as recited in claim 1 wherein said redundancy store system includes a RAID array.

8. A video content server system as recited in claim 1 wherein said redundancy store system includes an error correction coding scheme.

9. A video content server system as recited in claim 1 wherein said license information pertains to at least one of: (a) more than one authorized user; and (b) more than one authorized machine.

* * * * *